(12) United States Patent
Aoki (10) Patent No.: US 6,385,984 B2
(45) Date of Patent: May 14, 2002

(54) AIR CONDITIONING APPARATUS FOR VEHICLE

(75) Inventor: Kyouji Aoki, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/772,939

(22) Filed: Jan. 31, 2001

(30) Foreign Application Priority Data

Feb. 3, 2000 (JP) ........................................ 2000-026621

(51) Int. Cl.⁷ ................................................. B60H 1/32
(52) U.S. Cl. ........................... 62/244; 277/642; 277/928
(58) Field of Search ........................... 62/244; 277/928, 277/642, 630

(56) References Cited

U.S. PATENT DOCUMENTS

| | | | | |
|---|---|---|---|---|
| 5,954,578 A | * | 9/1999 | Takasaki | 454/121 |
| 6,062,298 A | * | 5/2000 | Lee | 165/42 |
| 6,241,256 B1 | * | 6/2001 | Suggs et al. | 277/630 |

FOREIGN PATENT DOCUMENTS

GB  2093105 A  *  8/1982

* cited by examiner

Primary Examiner—William E. Tapolcai
Assistant Examiner—Mohammad M Ali
(74) Attorney, Agent, or Firm—Sughrue Mion, PLLC (57) ABSTRACT

A receiving recess groove for a waterproof member is formed on a separation surface of a bottom portion in a unit case of a vertical-split type constituted by at least two case members having the separation surface, along the separation surface. A rod-like waterproof member having an elasticity is received within the receiving recess groove in a compressed state. Then, in the unit case, a storage gap positioned in an inner wall surface side of the unit case among gaps with respect to the waterproof member within the receiving recess groove and through which a water enters from the inner portion of the unit case, and a communicating portion for communicating with the inner portion of the unit case are respectively provided at both end portions of the receiving recess groove.

13 Claims, 11 Drawing Sheets

AIR CONDITIONING APPARATUS FOR VEHICLE

BACKGROUND OF THE INVENTION

1. Field of the Invention

The present invention relates to an air conditioning apparatus for a vehicle which is mainly employed for an automobile.

2. Description of the Related Art

Figure 13:
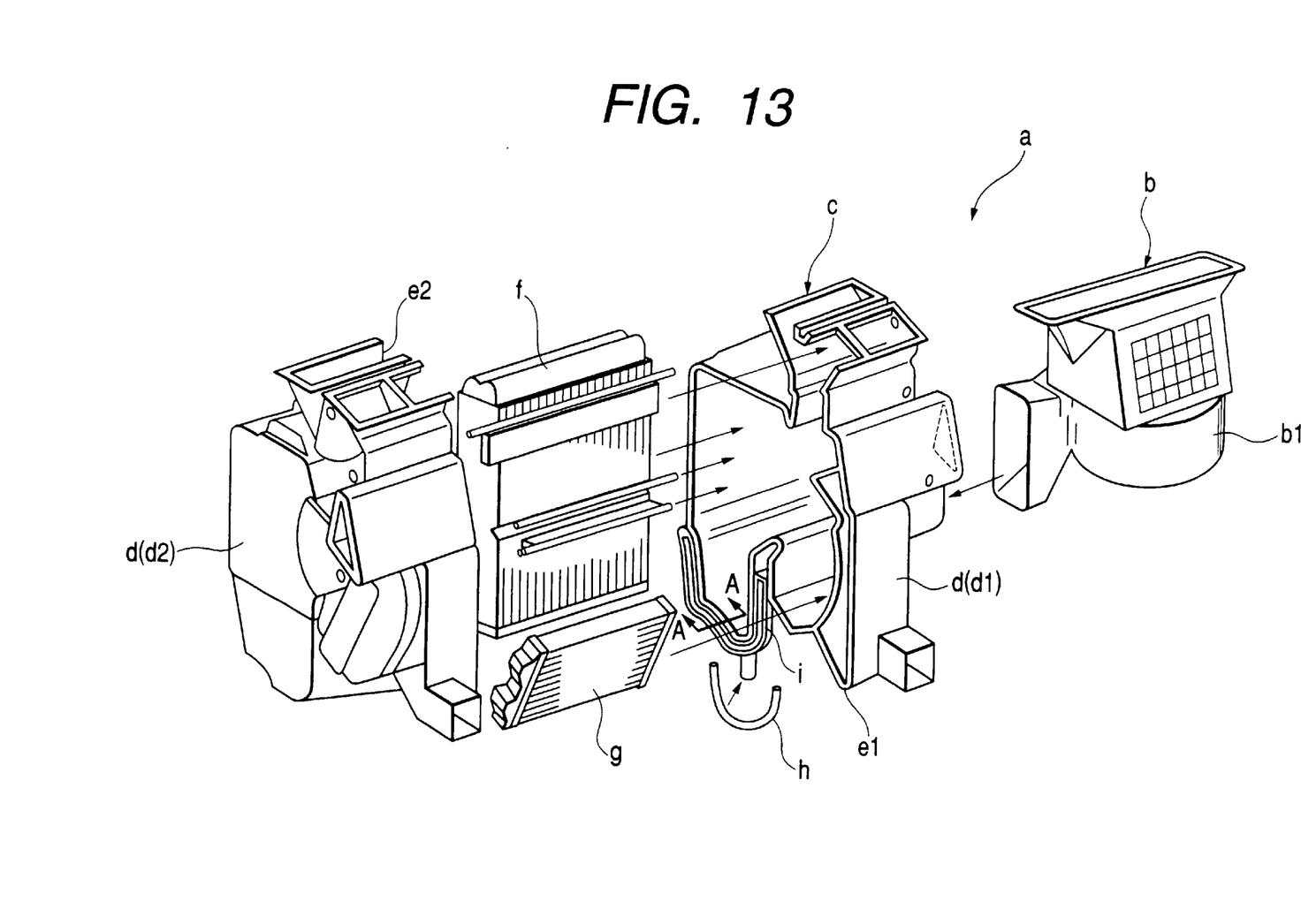
FIG. 13 is an exploded perspective view showing an embodiment of a conventional product.
Figure 14:
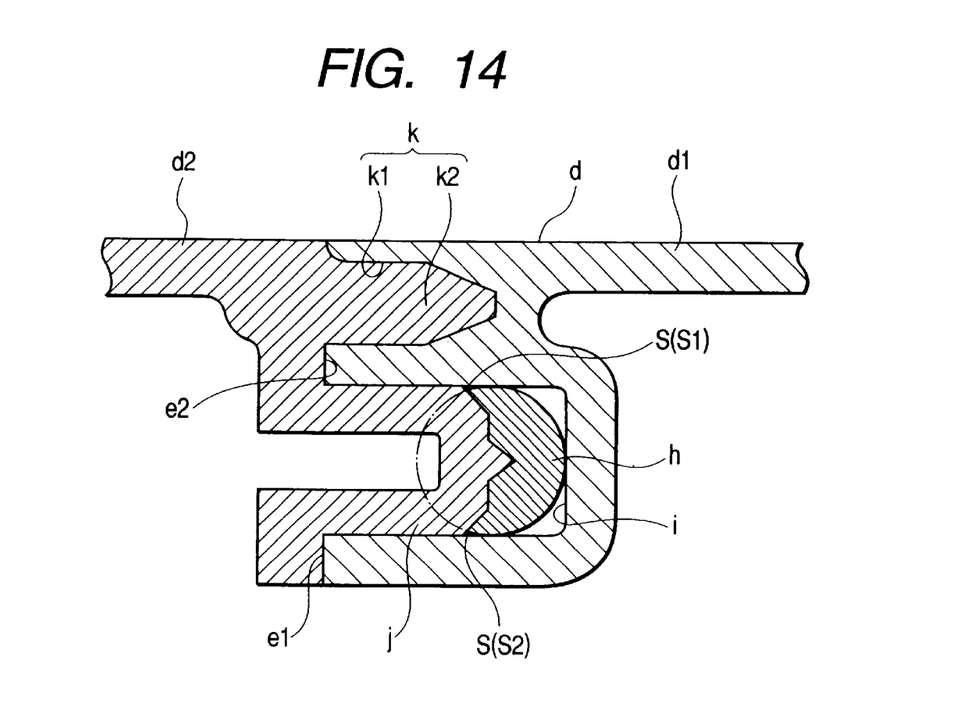
FIG. 14 is a cross sectional view along a line A—A of the structure shown in FIG. 13.

FIG. 13 is an exploded perspective view showing an embodiment of a conventional product. FIG. 14 is a cross sectional view along a line A—A in FIG. 13. An air conditioning apparatus a for a vehicle shown in FIG. 13 corresponds to a structure disclosed in Japanese Patent Application Laid-Open Publication No. 10-100642, and is provided with a blower unit b for selectively blowing an internal air within a passenger's room or an external air outside the vehicle, and an air conditioning unit c for air conditioning the blower fed from the blower unit b.

The air conditioning unit c is provided with a vertical-split type unit case d, and the unit case d is constituted by a first case member d1 having a vertical separation surface e1 and a second case member d2 having a vertical separation surface e2. A cooling heat exchanger f for cooling a blowing wind from the blower unit b and a heating heat exchanger g for heating a blowing wind passing through the cooling heat exchanger f are received within the unit case d.

As shown in FIGS. 13 and 14, a receiving recess groove i for a waterproof member h which waterproofs a condensed water generated due to a dehumidification in the cooling heat exchanger f is formed along the separation surface e1 of the predetermined portion, on the separation surface e1 in a predetermined portion covering a lower end portion of the cooling heat exchanger f, in a bottom portion of the first case member d1. Further, a fitting recess groove k1 of a recess and convex fitting portion k for assembling the first case d1 with the second case member d2 is also formed on the separation surface e1 of the first case member d1. The fitting recess groove k1 is formed all around the separation surface e1, and is positioned inside the receiving recess groove i in the predetermined portion of the first case member d1. A rod-like waterproof member h having an elasticity is received within the receiving recess groove i in a state of being pressed and compressed by a pressing rib j mentioned below.

The pressing rib j fitted to the receiving recess groove i of the first case member d1 so as to press and compress the waterproof member h within the receiving recess groove i is formed along the separation surface e2 in the predetermined portion, on the partition surface e2 in the predetermined portion covering the lower end portion of the cooling heat exchanger f, in the bottom portion of the second case member d2. Further, a fitting rib k2 of the recess and convex fitting portion k fitted to the fitting recess groove k1 of the first case member d1 is also formed on the separation surface e2 of the second case member d2. The fitting rib k2 is formed all around the separation surface e2, and is positioned inside the pressing rib j in the predetermined portion of the second case member d2.

In this case, a gap S with respect to the waterproof member h is formed at four corners within the receiving recess groove i. In particular, since a beveling is applied to a front end portion of the pressing rib j so as to make it easy to insert within the receiving recess groove i, gaps S1 and S2 with respect to the waterproof member h are easily formed in an open end side of the receiving recess groove i, within the receiving recess groove i.

A condensed water generated due to the dehumidification in the cooling heat exchanger f and dropping from the cooling heat exchanger f enters and stores in accordance with a capillary phenomenon to the portion positioned below the cooling heat exchanger f, in the gap S1 positioned in the open end side of the receiving recess groove i and the inner wall surface side of the unit case d among the gap S with respect to the waterproof member h within the receiving recess groove i. Further, the stored condensed water ascends in the gap S in correspondence to the internal pressure increase within the unit case d at a time of operating the air conditioning apparatus a and reaches the front end of the waterproof member f, and circulates in the gap S2 in the outer wall surface side of the unit case d from the front end thereof so as to leak out of the unit case d.

In the same manner, in the case that the unit case b1 of the blower unit b is the vertical-split type, even when the receiving recess groove i is provided on the separation surface of the bottom portion in the unit case b1 and the waterproof member h is received within the receiving recess groove i in a compressed state, a water such as a rainwater or the like entering within the unit case b1 together with the external air outside the vehicle enters and stores to the gap S1 with respect to the waterproof member h within the receiving recess groove i, and leaks out of the unit case b1 in accordance with an increase of the internal pressure within the unit case b1 at a time of operating the air conditioning apparatus a.

Figure 15:
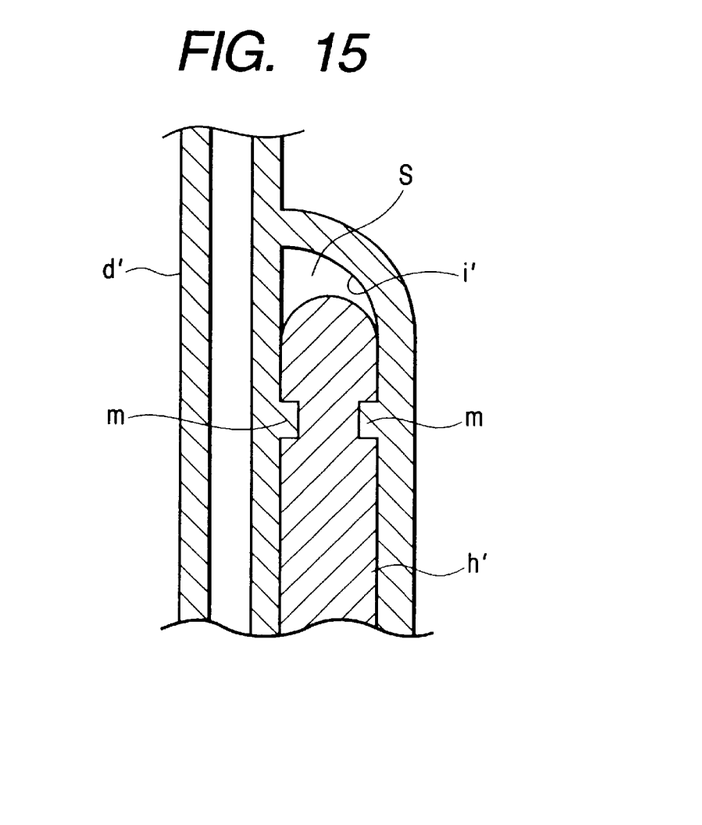
FIG. 15 is a cross sectional view of a main portion showing another embodiment of the conventional product.

In order to prevent the leakage of water mentioned above, in accordance with the conventional product illustrated in FIG. 15, a waterproof reinforcing rib m for reinforcing a waterproof of an end portion of a waterproof member h' within a receiving recess groove i' and preventing the condensed water from circulating from a front end of the waterproof member h' is provided on an inner wall surface of the receiving recess groove i'. However, in accordance with the conventional product, a time for attaching the waterproof member h' within the receiving recess groove i' is increased and a production cost is increased.

SUMMARY OF THE INVENTION

Accordingly, an object of the present invention is to provide an air conditioning apparatus for a vehicle which can prevent a unit case from a leakage of water and can prevent a time for attaching a waterproof member within a receiving recess groove from being increased so as to reduce a production cost.

In accordance with a first aspect of the present invention, there is provided an air conditioning apparatus for a vehicle comprising:

- a vertical-split type unit case formed by assembling at least two case members having separation surfaces;
- a receiving recess groove for a waterproof member formed on the separation surface of a bottom portion in the unit case along the separation surface; and
- the rod-like waterproof member having an elasticity, which is received within the receiving recess groove in a compressed state, wherein a storage gap positioned in a side of an inner wall surface of the unit case among the gap with respect to the waterproof member within the receiving recess groove and storing a water entered from the inner portion of the unit case, and communicating portion communicating with the inner portion of the unit case are respectively provided at both end portions of the receiving recess groove in the unit case.

In accordance with a second aspect of the present invention, there is provided an air conditioning apparatus for a vehicle as recited in the first aspect, wherein the communicating portion is provided in an upward inclined portion of the unit case upward inclined toward a front end of the closest receiving recess groove.

In accordance with a third aspect of the present invention, there is provided an air conditioning apparatus for a vehicle as recited in the first or second aspect, wherein a fitting recess groove of a recess and convex fitting portion for assembling the case member is formed to an upper portion from the receiving recess groove along the receiving recess groove, in an inner side of the receiving recess groove, on the separation surface of the unit case, the communicating portion communicates the gap within the fitting recess groove of the recess and convex fitting portion with the inner portion of the unit case.

In accordance with a fourth aspect of the present invention, there is provided an air conditioning apparatus for a vehicle as recited in any one of the first to third aspects, wherein a cooling heat exchanger for cooling a blower is arranged within the unit case, and the receiving recess groove is formed on the separation surface in a predetermined portion covering a lower end portion of the cooling heat exchanger, in the bottom portion of the unit case.

In accordance with the invention described in the first aspect, since the storage gap positioned in the side of the inner wall surface of the unit case among the gap with respect to the waterproof member within the receiving recess groove and storing the water entered from the inner portion of the unit case, and the communicating portion communicating with the inner portion of the unit case are respectively provided at both end portions of the receiving recess groove in the unit case, it is possible to make a pressure applied to both ends of the stored water the same as an internal pressure within the unit case even when the water enters into the storage gap between both of the communicating portions and stored therein.

Accordingly, even when the internal pressure within the unit case is increased, it is possible to prevent the water stored in the storage gap between both of the communicating portions from moving toward the front end of the waterproof member through the storage gap. Therefore, it is possible to prevent the water stored in the storage gap between both of the communicating portions from circulating from the front end of the waterproof member and it is possible to prevent the water from leaking out of the unit case. Further, since it is unnecessary to reinforce the waterproof performance of the end portion of the waterproof member within the receiving recess groove, it is possible to prevent the time for attaching the waterproof member within the receiving recess groove from being increased and it is possible to reduce the production cost.

In accordance with the invention described in the second aspect, in addition to the effect of the invention described in the first aspect, since the communicating portion is provided in the upward inclined portion of the unit case upward inclined toward the front end of the closest receiving recess groove, it is possible to introduce the water entering from the communicating portion to the storage gap, to the lower storage gap below the communicating portion, that is, the storage gap positioned between both of the communicating portions. Accordingly, it is possible to prevent the water entering from the communicating portion to the storage gap from leaking out of the unit case.

In accordance with the invention described in the third aspect, in addition to the effects of the inventions described in the first and second aspects, since the communicating portion communicates the gap within the fitting recess groove of the recess and convex fitting portion with the inner portion of the unit case, it is possible to make the pressure applied to both ends of the stored water the same as the internal pressure within the unit case even when the water enters and stores in the gap within the fitting recess groove positioned between both of the communicating portions. Accordingly, even when the internal pressure within the unit case is increased, it is possible to prevent the water stored in the gap within the fitting recess groove positioned between both of the communicating portions from moving upward from the receiving recess groove along the gap within the fitting recess groove so as to leak out of the unit case.

In accordance with the invention described in the fourth aspect, in addition to the effects of the inventions described in the first to third aspects, since the receiving recess groove is formed on the separation surface in a predetermined portion covering a lower end portion of the cooling heat exchanger, in the bottom portion of the unit case, it is possible to prevent the condensed water generated due to the dehumidification by the cooling heat exchanger and dropping down from the cooling heat exchanger from leaking out of the unit case.

DETAILED DESCRIPTION OF THE PRESENT INVENTION

First Embodiment

Figure 1:
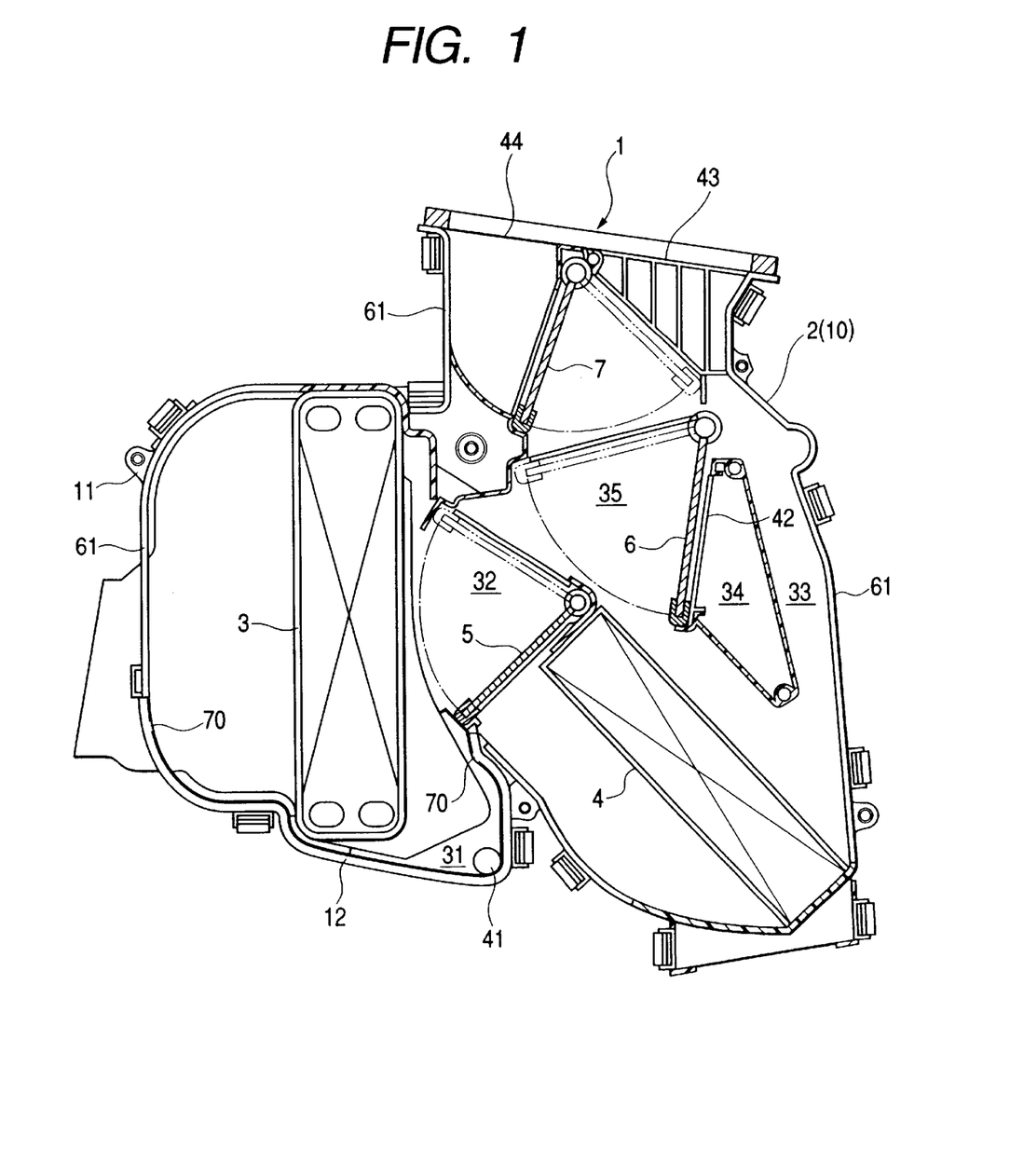
FIG. 1 is a cross sectional view showing a first embodiment in accordance with the present invention.
Figure 2:
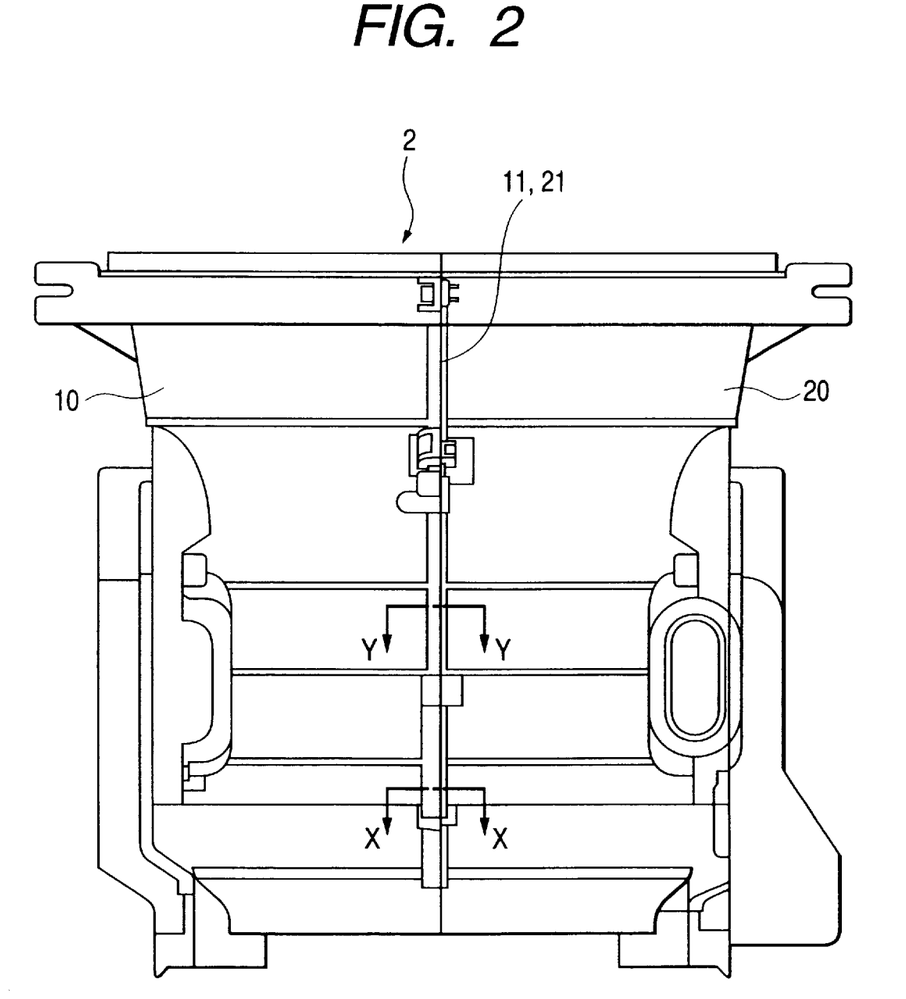
FIG. 2 is a back elevational view showing a unit case of the structure shown in FIG. 1.

FIG. 1 is a cross sectional view showing a first embodiment corresponding to an embodiment to which the inventions described in the first, second and fourth aspects are applied in a combined manner. FIG. 2 is a back elevational view showing a unit case of the structure shown in FIG. 1. An air conditioning unit 1 shown in FIG. 1 is used for an air conditioning apparatus mounted to a front portion of a passenger's room in an automobile, and is structured such that a blower unit (not shown) is connected thereto.

As shown in FIGS. 1 and 2, a unit case 2 of the air conditioning unit 1 is of a vertical-split type which can be separated into right and left portions, and is provided with a first case member 10 having a vertical separation surface 11 and a second case member 20 having a vertical separation surface 21 and assembled in the first case member 10. A blowing wind inflow port (not shown) into which a blowing wind flows from a blower unit is provided in the unit case 2.

A cooling heat exchanger 3 for cooling the blowing wind from the blower unit is arranged within the unit case 2, and a drain storage 31 for storing a condensed water generated due to a dehumidification in the cooling heat exchanger 3 is provided below the cooling heat exchanger 3. A water discharge port 41 for discharging the condensed water stored in the drain storage 31 is provided in a portion facing to the drain storage 31 in the unit case 2.

A heating heat exchanger 4 for heating a blowing wind passing through the cooling heat exchanger 3 is arranged within the unit case 2 in a downstream side of the blowing wind from the cooling heat exchanger 3, and a bypass passage 32 along which a blowing wind passing through the cooling heat exchanger 3 flows bypassing the heating heat exchanger 4 is provided within the unit case 2. A rotary type air mix door 5 for distributing the blowing wind passing through the cooling heat exchanger 3 to the bypass passage 32 and the heating heat exchanger 4 at a suitable rate is provided in the bypass passage 32.

A hot wind passage 33 along which a hot wind passing through the heating heat exchanger 4 mainly flows, a foot passage 34 which distributes the blowing wind within the unit case 2 at a passenger's feet via a foot duct (not shown), and an air mix chamber 35 which mixes the hot wind passing through the heating heat exchanger 4 with a cool wind passing through the bypass passage 32 are provided within the unit case 2 in the downstream side of the blowing wind from the heating heat exchanger 4. A rotary type foot door 6 opening and closing a foot blow-off port 42 is provided in the foot blow-off port 42 for communicating the air mix chamber 35 with the foot passage 34.

A vent blow-off port 43 and a defroster blow-off port 44 are provided on an upper wall of the unit case 2 positioned above the air mix chamber 35. A rotary type switching door 7 for switching a distribution of the blowing wind within the unit case 2 between the vent blow-off port 43 and the defroster blow-off port 44 is provided in a branch portion between the vent blow-off port 43 and the defroster blow-off port 44.

Figure 3:
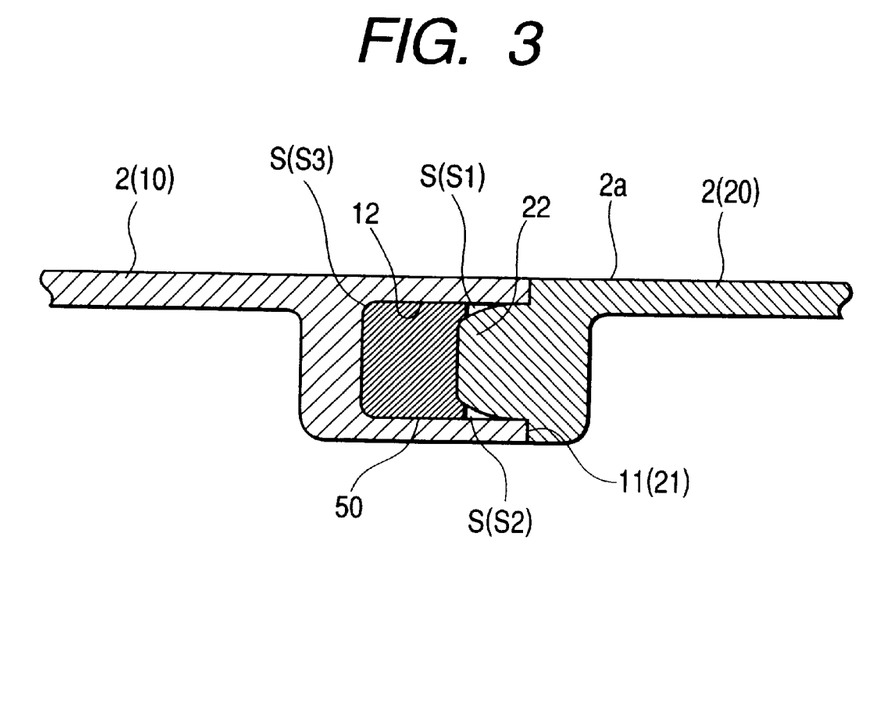
FIG. 3 is a cross sectional view along a line X—X of the structure shown in FIG. 2.
Figure 4:
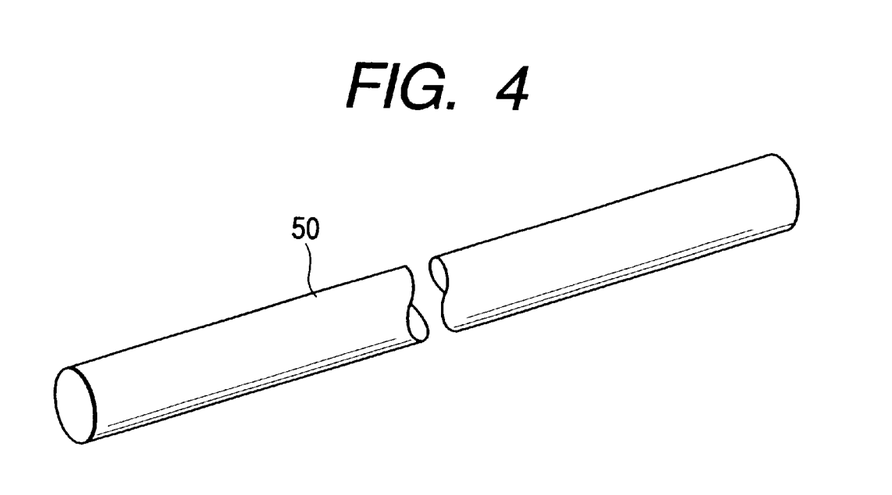
FIG. 4 is a perspective view showing a waterproof member shown in FIG. 3.
Figure 5:
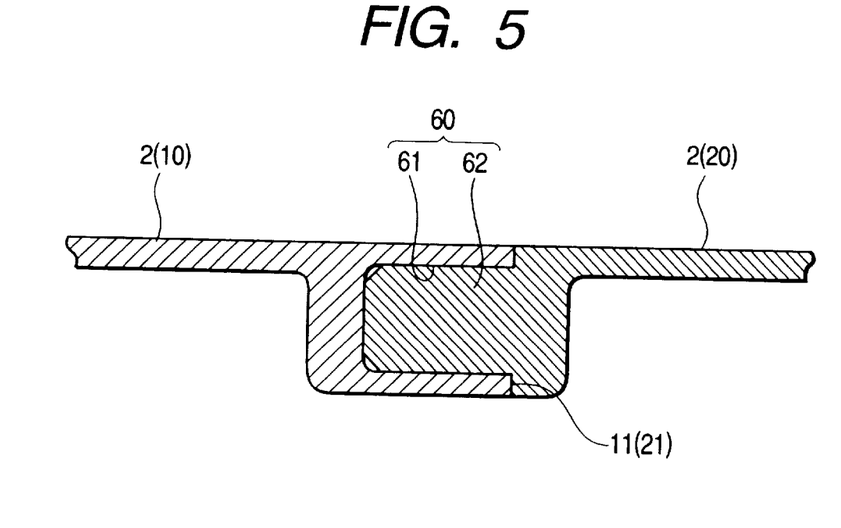
FIG. 5 is a cross sectional view along a line Y—Y of the structure shown in FIG. 2.

FIG. 3 is a cross sectional view along a line X—X of the structure shown in FIG. 2. FIG. 4 is a perspective view showing a waterproof member in FIG. 3. FIG. 5 is a cross sectional view along a line Y—Y of the structure shown in FIG. 2. As shown in FIGS. 1, 3 and 5, the first case member 10 of the unit case 2 is structured such that a receiving recess groove 12 for a waterproof member 50 which waterproofs the condensed water generated due to the dehumidification in the cooling heat exchanger 3 is formed on the separation surface 11 in the predetermined portion covering the lower end portion of the cooling heat exchanger 3 at a bottom portion thereof along the separation surface 11 in the predetermined portion. A fitting recess groove 61 of a recess and convex fitting portion 60 for assembling the second case member 20 is intermittently formed on the separation surface 11 in a portion other than the predetermined portion along the separation surface 11.

The rod-like waterproof member 50 (refer to FIG. 4) having an elasticity is received within the receiving recess groove 12 of the first case member 10 in a compressed state. A waterproof member made of a foamed ethylene propylene rubber and having a circular cross section with a diameter of 5 to 6 mm is employed for the waterproof member 50.

The second case member 20 is structured such that a pressing rib 22 fitted to the receiving recess groove 12 of the first case member 10 so as to press and compress the waterproof member 50 within the receiving recess groove 12 is formed on the separation surface 21 in the predetermined portion covering the lower end portion of the cooling heat exchanger 3 at a bottom portion thereof along the separation surface 21 in the predetermined portion. A fitting rib 62 of the recess and convex fitting portion 60 fitted to the fitting recess groove 61 of the first case member 10 is intermittently formed on the separation surface 21 in a portion other than the predetermined portion along the separation surface 21.

As shown in FIG. 3, the pressing rib 22 of the second case 20 is structured such as to compress the waterproof member 50 received within the receiving recess groove 12 of the first case member 10 at about a degree of 20 to 30% when the first case member 10 and the second case member 20 are assembled with each other, thereby pressure contacting the waterproof member 50 with an inner wall surface of the receiving recess groove 12. However, a gap S formed with respect to the waterproof member 50 is formed at each of four corners within the receiving recess groove 12.

In particular, since a beveling for making it easy to insert the pressing rib 22 into the receiving recess groove 12 is applied to a front end portion in the pressing rib 22 of the second case member 20, comparatively large gaps S1 and S2 are formed at upper and lower two portions in the open end side of the receiving recess groove 12 within the receiving recess groove 12 of the first case member 10.

In this case, the condensed water stored in the drain storage 31 after dropping down from the cooling heat exchanger 3 is discharged from a discharge port 41 of the unit case 2. However, the portion forming the drain storage 31 of the unit case 2 becomes in a wet state by the condensed water. Accordingly, a part of the condensed water stored in the drain storage 31 passes through a joint gap between the first case member 10 and the second case member 20 and enters to the gap S1 positioned at the inner wall surface 2a side of the unit case 2 in the open end side of the receiving recess groove 12 among the gaps S within the receiving recess groove 12 so as to be stored therein. Therefore, in the air conditioning unit 1, the gap S1 within the receiving recess groove 12 forms a storage gap in which the water enters from the inner portion of the unit case 2 and is stored.

Figure 6:
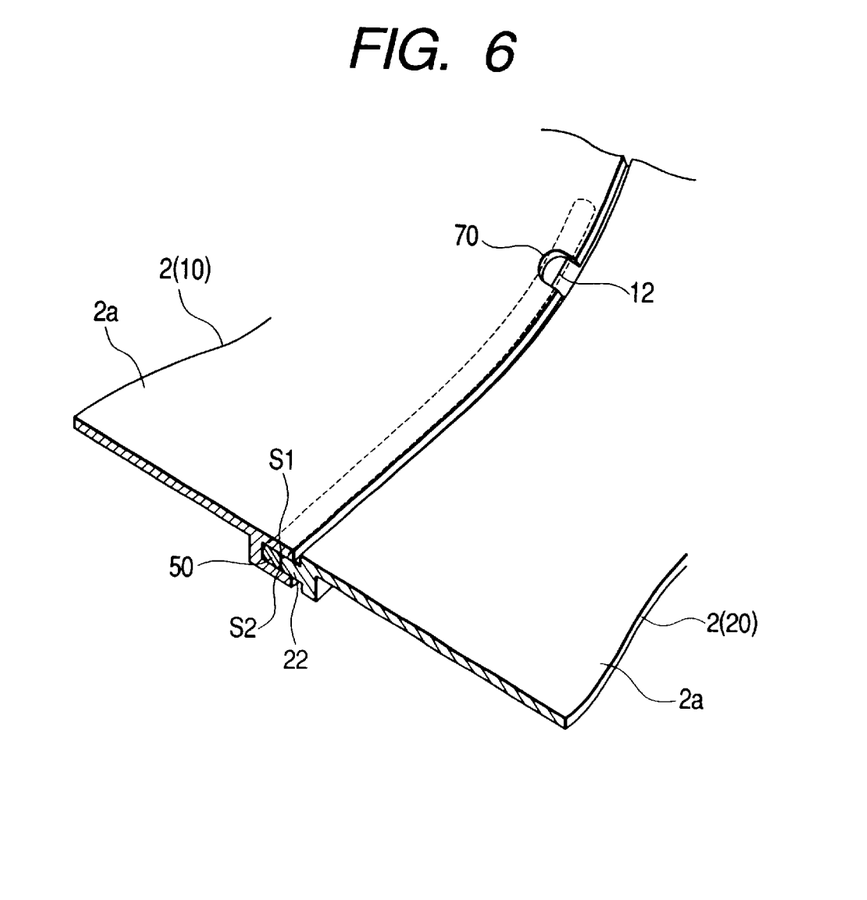
FIG. 6 is a perspective view showing a main portion of the structure shown in FIG. 2 in accordance with a cross section.

FIG. 6 is a perspective view showing a main portion of the unit case in accordance with a cross section. As shown in FIGS. 1 and 6, a communicating portion 70 for communicating the gap S1 within the receiving recess groove 12 with the inner portion of the unit case 2 is provided at each of both end portions of the receiving recess groove 12, in the first case member 10 of the unit case 2. Each of the communicating portions 70 is provided at an upward inclined portion of the unit case 2 upward inclined toward the front end of the closest receiving recess groove 12.

In the first embodiment mentioned above, since the communicating portion 70 for communicating the gap S1 within the receiving recess groove 12 with the inner portion of the unit case 2 is provided at both end portions of the receiving recess groove 12 of the unit case 2, it is possible to make a pressure applied to both ends of the stored condensed water the same as an internal pressure within the unit case 2 even when the condensed water enters to the gap S1 between both of the communicating portions 70 and 70 so as to be stored.

Accordingly, even when the internal pressure within the unit case 2 is increased at a time of operating the air conditioning apparatus of the vehicle, it is possible to prevent the condensed water stored in the gap S1 between both of the communicating portions 70 and 70 from ascending along the gap S1. Therefore, it is possible to prevent the condensed water stored in the gap S1 between both of the communicating portions 70 and 70 from circulating from the front end of the waterproof member 50 to the gap S2 from the gap S1, so that it is possible to prevent the condensed water from leaking out of the unit case 2 from the gap S2.

In this connection, in accordance with the experiments performed by the inventors of the present invention, even when the pressure within the unit case 2 is increased so that the internal pressure within the unit case 2 becomes 50 mmAq higher than the atmospheric pressure after the gap S1 between both of the communicating portions 70 and 70 is filled with the water, a leakage of water out of the unit case 2 is not recognized.

In this case, among the conventional products, for example, as shown in FIG. 15, there is a structure in which a waterproof reinforcing rib m for reinforcing a waterproof characteristic at an end portion of a waterproof member h' within the receiving recess groove i' so as to prevent the condensed water from circulating from the front end of the waterproof member h' is provided on an inner wall surface of the receiving recess groove i', in order to prevent the water from leaking out of the unit case d'. However, in the case of this conventional product, a time for attaching the waterproof member h' within the receiving recess groove i' is increased and a producing cost is caused to be increased.

On the contrary, in accordance with the first embodiment, since it is unnecessary to reinforce the waterproof characteristic of the end portion of the waterproof member 50 within the receiving recess groove 12, it is possible to avoid along time for attaching the waterproof member 50 in the receiving recess groove 12 so as to reduce a manufacturing cost.

Further, in accordance with the first embodiment, since the communicating portion 70 is provided in the upper inclined portion of the unit case 2 which is upward inclined toward the front end of the closest receiving recess groove 12, it is possible to introduce the condensed water entering to the gap S1 from the communicating portion 70 to the gap S1 below the communicating portion 70, that is, the gap S1 positioned between both of the communicating portions 70 and 70. Accordingly, it is also possible to prevent the condensed water entering to the gap S1 from the communicating portion 70 from leaking out of the unit case 2.

In this case, the communicating portion 70 may be structured such that as well as the gap S1 within the receiving recess groove 12, a gap S3 (refer to FIG. 3) positioned in the inner wall surface 2a side of the unit case 2 in a back wall side of the receiving recess groove 12 among the gaps S with respect to the waterproof member 50 within the receiving recess groove 12 is communicated with the inner portion of the unit case 2. By communicating the gap S3 with the inner portion of the unit case 2 by means of the communicating portion 70, even in the case that the condensed water is stored in the gap S3 between both of the communicating portions 70 and 70, it is possible to prevent the condensed water stored therein from circulating from the front end of the waterproof member 50 from the gap S3 to the gap S2 so as to prevent the condensed water from leaking out of the unit case 2.

In this case, in FIG. 6, the unit case 2 is structured such that the inner wall surface 2a of the first case member 10 and the inner wall surface 2a of the second case member 20 are not aligned with each other and the groove is formed on the inner wall surface 2a, however, it is a matter of course that the groove may be omitted.

Second Embodiment

Figure 7:
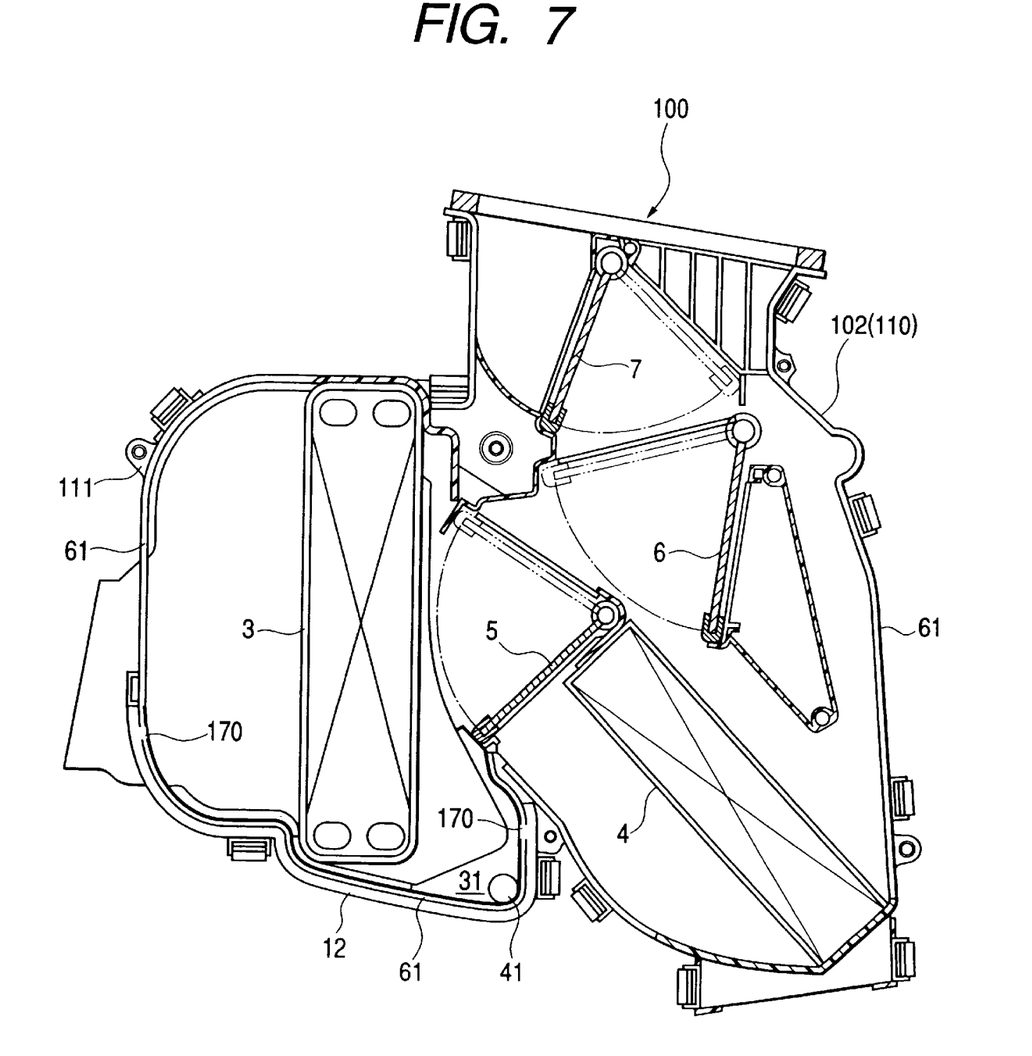
FIG. 7 is a cross sectional view showing a second embodiment in accordance with the present invention.
Figure 8:
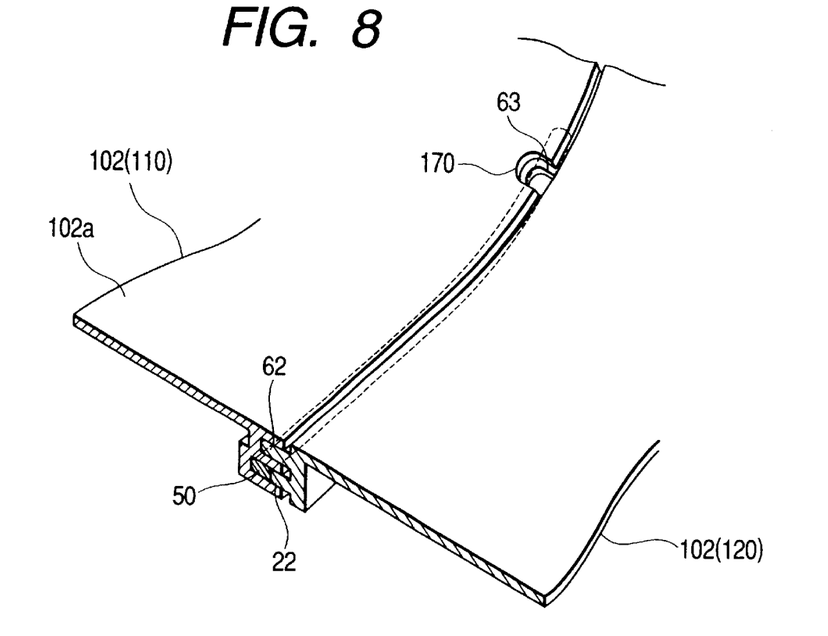
FIG. 8 is a perspective view of a main portion of a unit case of the structure shown in FIG. 7 in accordance with a cross section.
Figure 9:
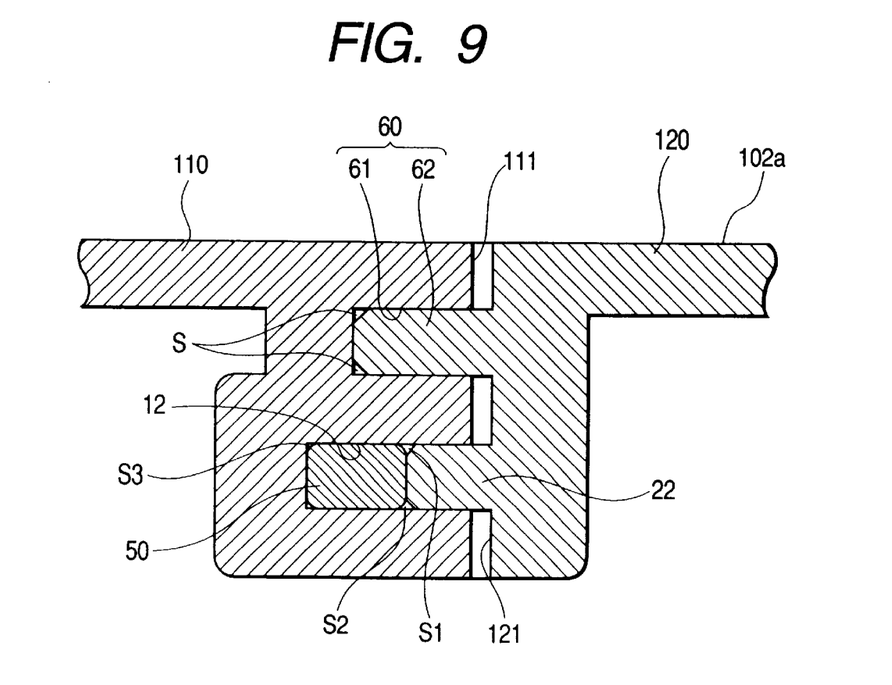
FIG. 9 is an enlarged cross sectional view showing a cross section in FIG. 8 in an enlarged manner.

FIG. 7 is across sectional view showing a second embodiment corresponding to an embodiment to which the inventions described in the first to fourth aspects are applied in a combined manner. FIG. 8 is a perspective view showing a main portion of a unit case of the structure shown in FIG. 7. FIG. 9 is an enlarged cross sectional view showing a cross section in FIG. 8 in an enlarged manner. In this case, in the following description of the second embodiment, the same reference numerals are attached to the same elements as those of the first embodiment, and an overlapping description with the description concerning the first embodiment will be omitted.

A unit case 102 of an air conditioning unit 100 shown in FIG. 7 is, in the same manner as that of the unit case 2 of the air conditioning unit 1, of a vertical-split type, and is provided with a first case member 110 having a vertical separation surface 111 and a second case member 120 having a vertical separation surface 121 and assembled in the first case member 110.

As shown in FIGS. 7 to 9, in a bottom portion of the first case member 110, the receiving recess groove 12 for the waterproof member 50 is formed on the separation surface 111 of the predetermined portion covering the lower end portion of the cooling heat exchanger 3, and the waterproof member 50 is received within the receiving recess groove 12 in a compressed state. Further, the fitting recess groove 61 of the recess and convex fitting portion 60 for assembling the second case 120 is formed inside the receiving recess groove 12 on the separation surface 111 of the first case member 110 so as to extend above the receiving recess groove 12 along the receiving recess groove 12.

The pressing rib 22 pressing and compressing the waterproof member 50 within the receiving recess groove 12 is formed on the separation surface 121 in the bottom portion of the second case member 120, and the fitting rib 62 of the recess and convex fitting portion 60 fitted to the fitting recess groove 61 of the first case member 110 is formed inside the pressing rib 22 so as to extend above the pressing rib 22 along the pressing rib 22. The notch portion 63 is provided at a portion at which a communicating portion 170 mentioned below is arranged, in the fitting rib 62.

A communicating portion 170 which communicates the gap S1 (the storage gap) within the receiving recess groove 12 with the inner portion of the unit case 102 and communicates the gap S within the fitting recess groove 61 of the recess and convex fitting portion 60 with the inner portion of the unit case 102 is provided in each of both end portions of the receiving recess groove 12, in the first case member 110. Each of the communicating portions 170 is provided at an upward inclined portion of the unit case 102 upward inclined toward the front end of the closest receiving recess groove 12. In this case, in FIGS. 8 and 9, reference numeral 102a denotes an inner wall surface of the unit case 102.

In the second embodiment mentioned above, since both of the communicating portions 170 and 170 communicate the gap S within the fitting recess groove 61 of the recess and convex fitting portion 60 with the inner portion of the unit case 102, it is possible to make a pressure applied to both ends of the stored condensed water the same as an internal pressure within the unit case 102 even when the condensed water enters to the gap S within the fitting recess groove 61 positioned between both of the communicating portions 170 and 170 from the inner portion of the unit case 102.

Accordingly, even when the internal pressure within the unit case 102 is increased at a time of operating the air conditioning apparatus of the vehicle, it is possible to prevent the condensed water stored in the gap S within the fitting recess groove 61 positioned between both of the communicating portions 170 and 170 from ascending along the gap S within the fitting recess groove 61 above the receiving recess groove 12 so as to leak out of the unit case 102.

Further, since each of the communicating portions 170 is provided at the upward inclined portion of the unit case 102 upward inclined toward the front end of the closest receiving recess groove 12, it is possible to introduce the condensed water entering into the gap S within the fitting recess groove 61 from the communicating portion 170 to the gap S within the fitting recess groove 61 positioned below the communicating portion 170, that is, the gap S within the fitting recess groove 61 positioned between both of the communicating portions 170 and 170. Accordingly, it is possible to prevent the condensed water entering into the gap S within the fitting recess groove 61 from the communicating portion 170 from leaking out of the unit case 102.

In this case, both of the communicating portions 170 and 170 may be structured such that the gap S3 within the receiving recess groove 12 is communicated with the inner portion of the unit case 102 together with the gap S within the fitting recess groove 61 and the gap S1 within the receiving recess groove 12. In accordance with the structure mentioned above, in the same manner as the case of the communicating portion 70 mentioned above, even in the case that the condensed water is stored in the gap S3 between both of the communicating portions 170 and 170, it is possible to prevent the stored condensed water from circulating from the front end of the waterproof member 50 from the gap S3 to the gap S2 so as to prevent the condensed water from leaking out of the unit case 102.

In this case, in FIGS. 8 and 9, the unit case 102 is structured such that the inner wall surface 102a of the first case member 110 and the inner wall surface 102a of the second case member 120 are not aligned with each other and the groove is formed on the inner wall surface 102a. However, it is a matter of course that the groove may be omitted.

Third Embodiment

Figure 10:
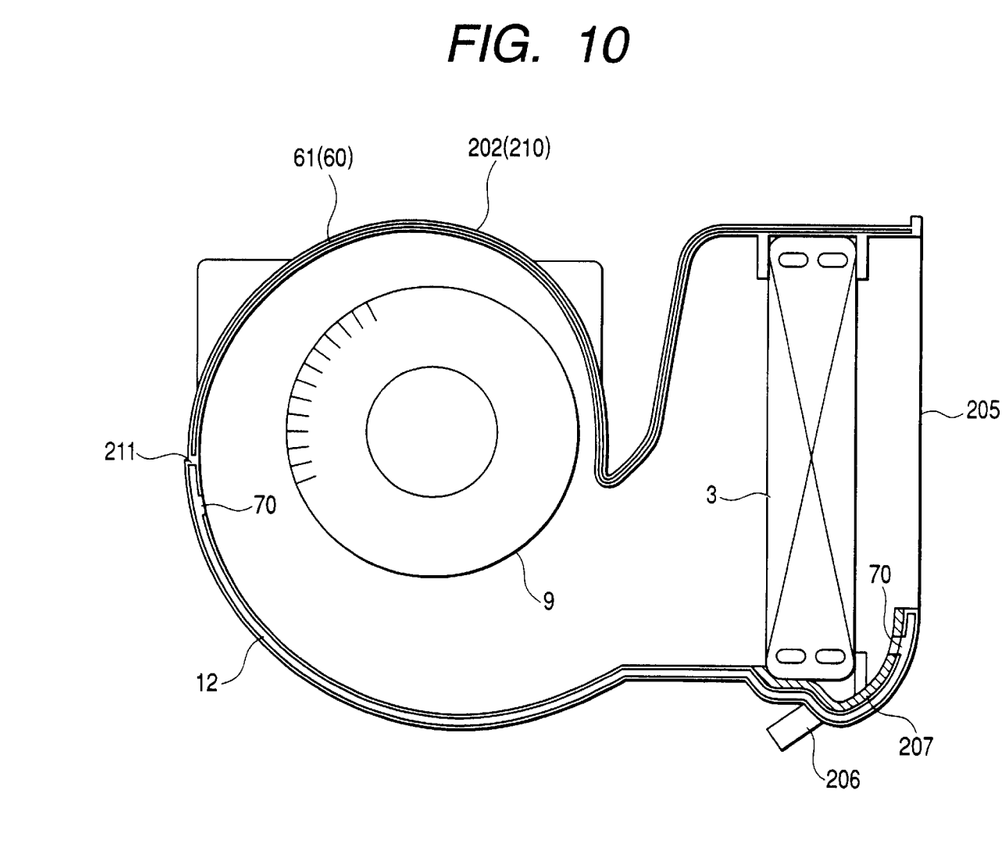
FIG. 10 is across sectional view showing a third embodiment in accordance with the present invention.
Figure 11:
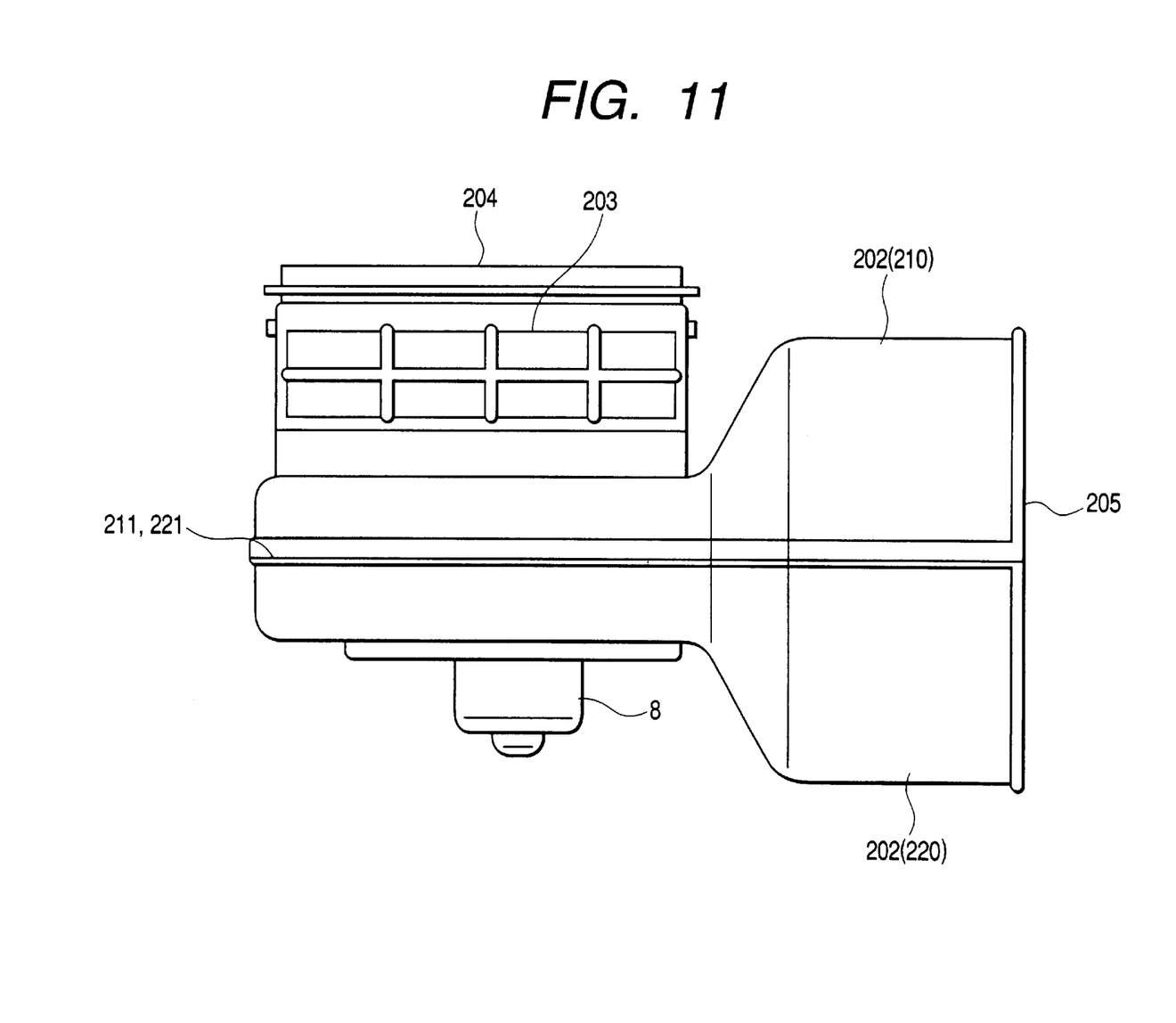
FIG. 11 is a plan view of the structure shown in FIG. 10.
Figure 12:
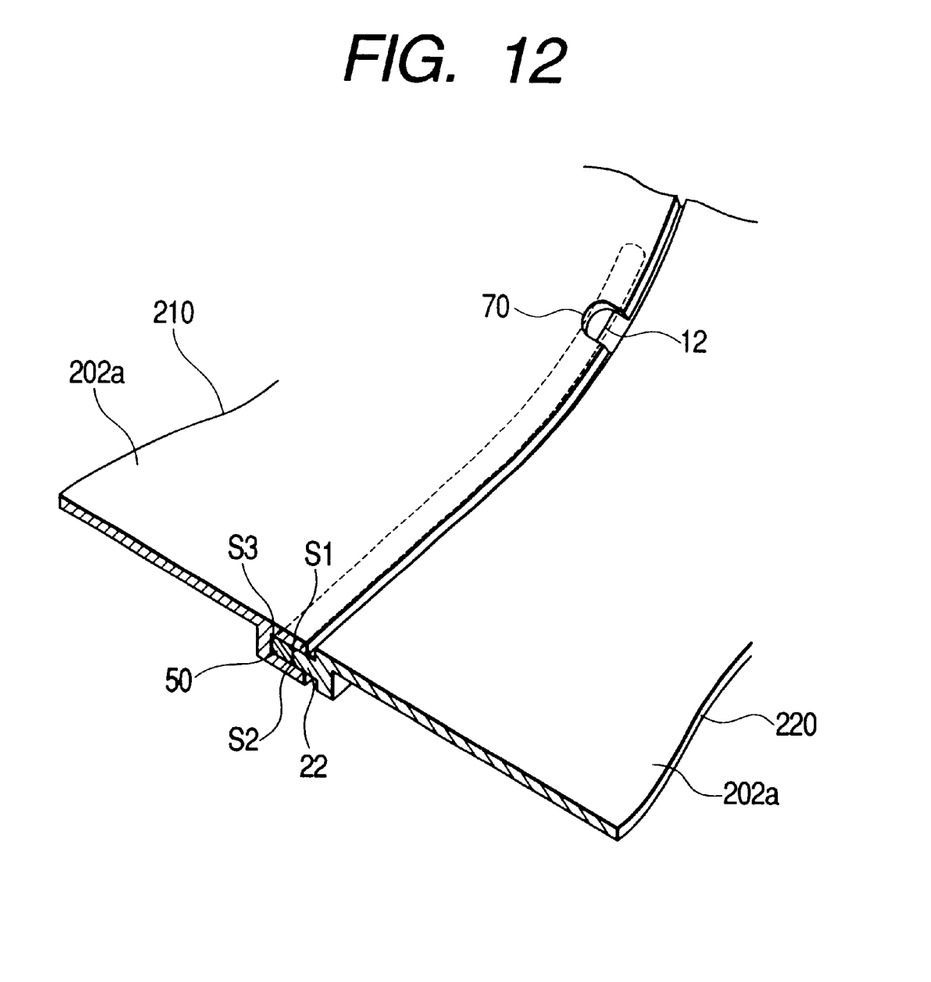
FIG. 12 is a perspective view of a main portion of a unit case of the structure shown in FIG. 10 in accordance with a cross section.

FIG. 10 is across sectional view showing a third embodiment corresponding to an embodiment different from the first embodiment corresponding to the embodiment to which the inventions described in the first, second and fourth aspects are applied in a combined manner. FIG. 11 is a plan view of the structure shown in FIG. 10. FIG. 12 is a perspective view showing a main portion of a unit case of the structure shown in FIG. 10 in accordance with a cross section. In this case, in the following description of the third embodiment, the same reference numerals are attached to the same elements as those of the first embodiment, and an overlapping description with the description concerning the first embodiment will be omitted.

As shown in FIGS. 10 and 11, in accordance with the third embodiment, the cooling heat exchanger 3 and a blowing multiblade fan 9 rotated by an electric motor 8 are arranged within a unit case 202. The cooling heat exchanger 3 is positioned at a position in a downstream side of blowing from the multiblade fan 9 and cools the blowing wind from the multiblade fan 9. The multiblade fan 9 introduces the internal air within the passenger's room or the external air out of the vehicle into the unit case 202 and blows out of the unit case 202.

An internal air introduction port 203 for introducing the internal air and an external air introduction port 204 for introducing the external air are provided in the unit case 202. Further, an internal and external air switching door (not shown) for closing the internal air introduction port 203 so as to open the external air introduction port 204 or opening the internal air introduction port 203 so as to close the external air introduction port 204 is arranged at a branch portion between the internal air introduction port 203 and the external air introduction port 204 within the unit case 202.

Further, a blowing wind outflow port 205 from which the blowing wind passing through the cooling heat exchanger 3 flows out of the unit case 202 is provided in the downstream side of the blowing wind from the cooling heat exchanger 3, in the unit case 202, and a discharge port (not shown) provided with a discharge pipe 206 is provided below the cooling heat exchanger 3. The structure is made such that a heater unit provided with a heating heat exchanger (not shown) is connected to the blowing wind outflow port 205. The structure is made such that the condensed water generated due to a dehumidification in the cooling heat exchanger 3 and dropping down from the cooling heat exchanger 3 and a water such as a rainwater entering into the unit case 202 together with the external air are discharged from the discharge pipe 206 out of the unit case 202.

The unit case 202 is, in the same manner as that of the unit case 2 of the air conditioning unit 1, of a vertical-split type, and is provided with a first case member 210 having a vertical separation surface 211 and a second case member 220 having a vertical separation surface 221 and assembled in the first case member 210.

As shown in FIGS. 10 and 12, in a bottom portion of the first case member 210 covering the lower end portion of the cooling heat exchanger 3 and positioned below the multiblade fan 9, the receiving recess groove 12 for the waterproof member 50 is formed on the separation surface 211 thereof along the separation surface 211, and the waterproof member 50 is received within the receiving recess groove 12 in a compressed state. The fitting recess groove 61 of the recess and convex fitting portion 60 for assembling the second case 220 is formed on the separation surface 211 in the portion other than the bottom portion of the first case member 210 along the separation surface 211.

The pressing rib 22 pressing and compressing the waterproof member 50 within the receiving recess groove 12 is formed on the separation surface 221 in the bottom portion of the second case member 220 along the separation surface 221. The fitting rib 62 of the recess and convex fitting portion 60 fitted to the fitting recess groove 61 of the first case member 110 is formed on the separation surface 221 in the portion other than the bottom portion of the second case member 220, in the same manner as that of the second case member 20 in FIG. 5, along the separation surface 221.

Further, a communicating portion 70 which communicates the gap S1 (the storage gap) within the receiving recess groove 12 with the inner portion of the unit case 202 is provided in each of both end portions of the receiving recess groove 12, in the first case member 210. Each of the communicating portions 70 is provided at an upward inclined portion of the unit case 202 upward inclined toward the front end of the closest receiving recess groove 12. In this case, in FIG. 10, reference numeral 207 denotes a heat insulating material and reference numeral 202a in FIG. 12 denotes an inner wall surface of the unit case 202.

In the third embodiment mentioned above, since the receiving recess groove 12 in which the waterproof member 50 is received in a compressed state is formed on the separation surface 211 in the bottom portion of the unit case 202, and the bottom portion of the unit case 202 covers the lower end portion of the cooling heat exchanger 3 and is positioned below the multiblade fan 9. Accordingly, the condensed water dropping down from the cooling heat exchanger 3 enters and is stored in the gap S1 within the receiving recess groove 12 positioned between both of the communicating portions 70 and 70, and the water such as the rainwater entering into the unit case 202 together with the external air enters and is stored therein.

However, since it is possible to make the pressure applied to both ends of the stored water the same as the internal pressure within the unit case 202 even when the water is stored in the gap S1 between both of the communicating portions 70 and 70, it is possible to prevent the water stored in the gap S1 between both of the communicating portions 70 and 70 from moving toward the front end of the waterproof member 50 along the gap S1 even when the internal pressure within the unit case 202 is increased at a time of operating the air conditioning apparatus. Accordingly, it is possible to prevent the water stored in the gap S1 between both of the communicating portions 70 and 70 from circulating to the gap S2 from the front end of the waterproof member 50 and it is possible to prevent the water from leaking out of the unit case 202 from the gap S2.

Therefore, in accordance with the third embodiment, it is possible to prevent the condensed water generated in the cooling heat exchanger 3 from leaking out of the unit case 202 and it is possible to prevent the water such as the rainwater or the like entering into the unit case 202 together with the external air from leaking out of the unit case 202.

In this case, both of the communicating portions 70 and 70 may be structured such that the gap S3 positioned in the inner wall surface 202a side of the unit case 202 and in the back wall side of the receiving recess groove 12 among the gaps S with respect to the waterproof member 50 within the receiving recess groove 12 is communicated with the inner portion of the unit case 2 together with the gap S1 within the receiving recess groove 12. In accordance with the structure that the gap S3 is communicated with the inner portion of the unit case 2 by the communicating portion 70, even in the case that the water such as the condensed water, the rainwater or the like is stored in the gap S3 between both of the communicating portions 70 and 70, it is possible to prevent the stored water from circulating from the front end of the waterproof member 50 from the gap S3 to the gap S2 so as to prevent the water from leaking out of the unit case 202 from the gap S2.

Further, for example, as in a unit case b1 of a blower unit b illustrated in FIG. 13, in the case of a unit case in which the cooling heat exchanger 3 is not received therewithin and only a blowing fan of a blower is received and which is of avertical-split type, it is a matter of course that it is possible to prevent the water such as the rainwater or the like entering into the unit case together with the external air from leaking out of the unit case by forming the receiving recess groove 12 on the separation surface of the bottom portion of the unit case, receiving the waterproof member 50 within the receiving recess groove 12 thereof in a compressed state and providing with the communicating portion 70 for communicating the storage gap S1 within the receiving recess groove 12 with the inner portion of the unit case at each of both end portions of the receiving recess groove 12.

In this case, in FIG. 12, the unit case 202 is structured such that the inner wall surface 202a of the first case member 210 and the inner wall surface 202a of the second case member 220 are not aligned with each other and the groove is formed on the inner wall surface 202a. However, the groove may be omitted.

Further, in each of the first to third embodiments, the second case members 20, 120 and 220 are provided with the pressing rib 22 for pressing and compressing the waterproof member 50 on the separation surfaces 21, 121 and 221. However, the second case member 20, 120 and 220 may be structured such that the separation surfaces 21, 121 and 221 are formed in a pressing flat surface for pressing and compressing the waterproof member 50, or the structure may be made such that the receiving recess groove 12 is formed together with the recess groove of the first case member and a pressing recess groove for pressing and compressing the waterproof member 50 is provided on the separation surfaces 21, 121 and 221.

What is claimed is:

1. An air conditioning apparatus for a vehicle comprising:
   a unit case including a first case having a first separation surface and a second case having a second separation surface;
   a receiving groove defined along the second separation surface in the second case; and
   a waterproof member received within the receiving groove in a compressed state,
   wherein a first storage gap is defined in the receiving groove; and
   a communicating portion communicating the first gap with the inner portion of the unit case is defined in the second case.

2. The air conditioning apparatus as claimed in claim 1, wherein the communicating portion is defined in an upward inclined portion of the unit case inclined toward an end of the receiving groove.

3. The air conditioning apparatus as claimed in claim 1, wherein a fitting groove for assembling the first and second cases is formed inner than the receiving groove along the receiving groove in the second separation surface of the second case; and
   the communicating portion communicates a second gap in the fitting groove with the inner portion of the unit case.

4. The air conditioning apparatus as claimed in claim 1 further comprising a heat exchanger disposed in the unit case,
   wherein the receiving groove is formed on the second separation surface in a predetermined portion covering a lower end portion of the heat exchanger, and the receiving groove is in the bottom portion of the second case.

5. The air conditioning apparatus as claimed in claim 1 wherein the first gap is surrounded by the first case, the waterproof member, and the second case in the receiving groove.

6. The air conditioning apparatus as claimed in claim 3 wherein the second gap is surrounded by the first case and the second case in the fitting groove.

7. The air conditioning appratus as claimed in claim 4 wherein the heat exchanger is a cooling heat exchanger for cooling a blower in the unit case.

8. The air conditioning apparatus as claimed in claim 1 wherein the first case has a first protrusion formed along the first separation surface and inserted in the receiving groove to compress the waterproof member.

9. The air conditioning apparatus as claimed in claim 3 wherein the first case has a second protrusion formed along the first separation surface and inserted in the fitting groove.

10. The air conditioning apparatus as claimed in claim 1 wherein the first and second separation surfaces vertically splits the unit case.

11. The air conditioning apparatus as claimed in claim 1 wherein the first gap stores water entered from the inner portion of the unit case.

12. The air conditioning apparatus as claimed in claim 1 wherein the communicating portion includes two communicating portions defined at both end portions of the receiving groove.

13. The air conditioning apparatus as claimed in claim 1 wherein the waterproof member has elasticity, and is formed of a rod shape.

* * * * *